(12) United States Patent
Saito

(10) Patent No.: US 7,551,841 B2
(45) Date of Patent: Jun. 23, 2009

(54) VIDEO CAMERA

(75) Inventor: Kyota Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 11/176,466

(22) Filed: Jul. 7, 2005

(65) Prior Publication Data

US 2006/0018207 A1    Jan. 26, 2006

(30) Foreign Application Priority Data

Jul. 23, 2004  (JP) .............................. 2004-216246
May 20, 2005  (JP) .............................. 2005-148319
Jun. 3, 2005   (JP) .............................. 2005-164586

(51) Int. Cl.
*H04N 5/00*    (2006.01)
(52) U.S. Cl. .................... 386/117; 386/46; 369/30.01
(58) Field of Classification Search ................ 386/117, 386/46; 369/30.01
See application file for complete search history.

(56) References Cited

U.S. PATENT DOCUMENTS 5,067,029 A * 11/1991 Takahashi .................... 386/38

FOREIGN PATENT DOCUMENTS

JP       2003-101824       4/2003

* cited by examiner

*Primary Examiner*—Thai Tran
*Assistant Examiner*—Girumsew Wendmagegn
(74) *Attorney, Agent, or Firm*—Cowan, Liebowitz & Latman, P.C.

(57) ABSTRACT

The present invention provides a video camera which ensures that the user will recognize recording mode, thereby preventing the user from confusing a target recording medium. For that, the video camera 100 has a character information composition unit 3 which composites image data outputted by a signal processing unit 2 with predetermined information consisting of characters or pictographic characters to be recognized by the user during operation and outputs a resulting video signal, a liquid crystal monitor 4 which displays the video signal outputted by the character information composition unit 3, a magnetic tape recording unit 8, and a memory card recording unit 9. The predetermined information is target media information which indicates whether the image data outputted by the electronic camera unit 1 is to be recorded on the magnetic tape recording unit 8 or memory card recording unit 9. Immediately after start of recording, a system control unit 5 displays an animated icon which appears to rotate.

4 Claims, 5 Drawing Sheets

VIDEO CAMERA

CLAIM OF PRIORITY

This application claims priority from Japanese Patent Applications No. 2004-216246 filed on Jul. 23, 2004, No. 2005-148319 filed on May 20, 2005 and No. 2005-164586 filed on Jun. 3, 2005, the entire contents of which are hereby incorporated by reference herein.

FIELD OF THE INVENTION

The present invention relates to a video camera, and more particularly, to a video camera which displays operation information.

BACKGROUND OF THE INVENTION

Recent video cameras have not only a function to record moving images on magnetic tape media, but also a function to record still images and moving images on a removable non-volatile semiconductor memory card. Using a single video camera, users can take and record moving images and still images to view them on a home television set or personal computer, print them as pictures, or deliver video media via e-mail or the Internet.

The conventional video cameras record information on magnetic tape and memory cards as follows.

First, a user switches from PHOTO OFF to PHOTO ON using a power switch of the video camera. Then, the user switches to tape recording mode or card recording mode using a recording mode selector switch. If the power switch and recording mode selector switch are combined into a single switch, the single switch is used to switch power ON/OFF, tape recording/card recording mode, etc.

Upon switching to tape recording mode or card recording mode, a message or pictographic character appears on the video camera's liquid crystal monitor for use to view a subject, indicating whether the current recording mode is the magnetic tape recording mode or memory card recording mode.

To record images in the indicated recording mode, the user presses a record button to record image data of the acquired images on a target recording medium corresponding to the recording mode.

As an example of cameras which switch among monitor displays in relation to switching among shooting modes, there are digital cameras which allow a mode to be selected from among a plurality of modes including still image mode, continuous shooting mode, and moving image mode. When a recording mode is selected, such digital cameras display an icon of the selected recording mode on an image monitor for a certain time before shifting to the selected recording mode (e.g., Japanese Patent Laid-Open No. 2003-101824).

However, with the conventional video cameras, to know the current recording medium, the operator must view information on a liquid crystal monitor or remember the mode he/she has selected: the tape recording mode or card recording mode. When displaying the recording mode on the liquid crystal monitor, the user must check the mode deliberately, which is troublesome. When relying on memory, the operator is liable to get something wrong. In particular, with a model equipped with a separate record switch and recording mode selector switch rather than a combination switch which combines a record switch and recording mode selector switch, the user it too preoccupied with operating the record switch to pay attention to the recording mode.

SUMMARY OF THE INVENTION

The present invention has an object to provide a technique for actively notifying the user of recording mode.

To achieve the above object, the present invention provides a video camera, comprising:

an electronic camera unit which outputs image data; a first recording medium which records the outputted image data; a second recording medium which records the outputted image data; a switching unit which switches a target recording medium for the image data between the first recording medium and the second recording medium; an information composition unit which composites the outputted image data with predetermined information and outputs a resulting video signal; and a display unit which displays the video signal outputted by the information composition unit, wherein the predetermined information is target media information which indicates whether the outputted image data is to be recorded on the first recording medium or the second recording medium.

The present invention provides another video camera having an image sensing unit, capable of mounting a first recording medium which stores acquired images and a second recording medium which is different from the first recording medium, the video camera comprising:

a selection unit which selects whether the images picked up by the image sensing unit are to be stored on the first or second recording medium;

a display unit which displays the images picked up by the image pickup unit and state of equipment;

a record command unit which gives a command to start or stop recording the images sensed by the image sensing unit on the recording medium selected by the selection unit; and a display control unit which controls the display unit according to the command given by the record command unit, wherein the display control unit:

displays a still image icon in the display unit, indicating the recording medium selected by the selection unit if recording on the selected recording medium is stopped, and displays an animated icon in the display unit, indicating the recording medium selected by the selection unit if recording on the selected recording medium is in progress.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment of the present invention will be described below with reference to the drawings.

Figure 1:
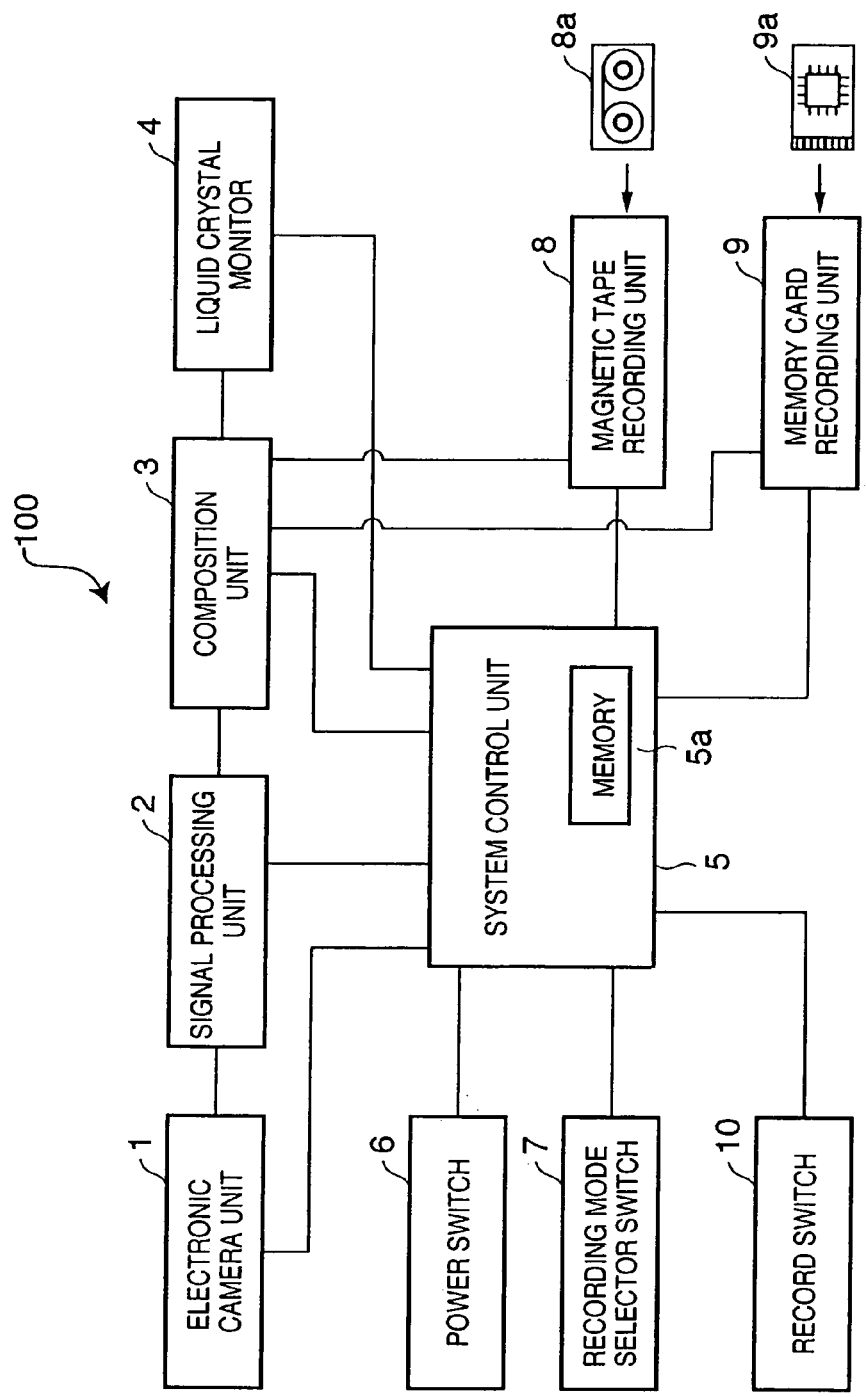
FIG. 1 is a block diagram schematically showing a video camera according to an embodiment of the present invention.

FIG. 1 is a block diagram schematically showing a video camera 100 according to an embodiment of the present invention.

In FIG. 1, the video camera 100 includes a system control unit 5 which controls the entire equipment, lens, diaphragm, CCD, etc. and has an electronic camera unit 1 which converts an optical signal from a subject into an electrical signal and outputs image data, a signal processing unit 2 which performs image processing on the image data outputted by the electronic camera unit 1, a composition unit 3 which composites the image data outputted by the signal processing unit 2 with predetermined information outputted from the system control unit 5 and outputs results of composition as a video signal, and a liquid crystal monitor 4 which displays the video signal outputted by the composition unit 3.

Also, the video camera 100 is equipped with a power switch 6 for use to turn on and off the video camera 100, a recording mode selector switch 7 for use to switch recording mode, and a record switch 10 for use to specify whether or not to perform video recording. Besides, it is equipped with various switches related to playback, but they are not illustrated.

Also, the video camera 100 is equipped with a magnetic tape recording unit 8 which houses a magnetic tape cassette 8a and records image data outputted from the signal processing unit 2 on magnetic tape in the magnetic tape cassette 8a as a video record as well as with a memory card recording unit 9 which houses a memory card 9a and records image data outputted from the signal processing unit 2 on the memory card 9a as a video record.

The recording mode selector switch 7 is used to select between card recording mode in which acquired images are recorded on the memory card 9a and tape recording mode in which acquired images are recorded on the magnetic tape cassette 8a. The record switch 10 is used to specify whether or not to perform video recording. Pressing the record switch 10 toggles between ON and OFF. When the record switch 10 is turned ON, the system control unit 5 records the image data processed by the signal processing unit 2 on a recording medium (the magnetic tape cassette 8a or memory card 9a) by controlling the magnetic tape recording unit 8 or memory card recording unit 9 whichever has been selected by the recording mode selector switch 7.

Figure 3:
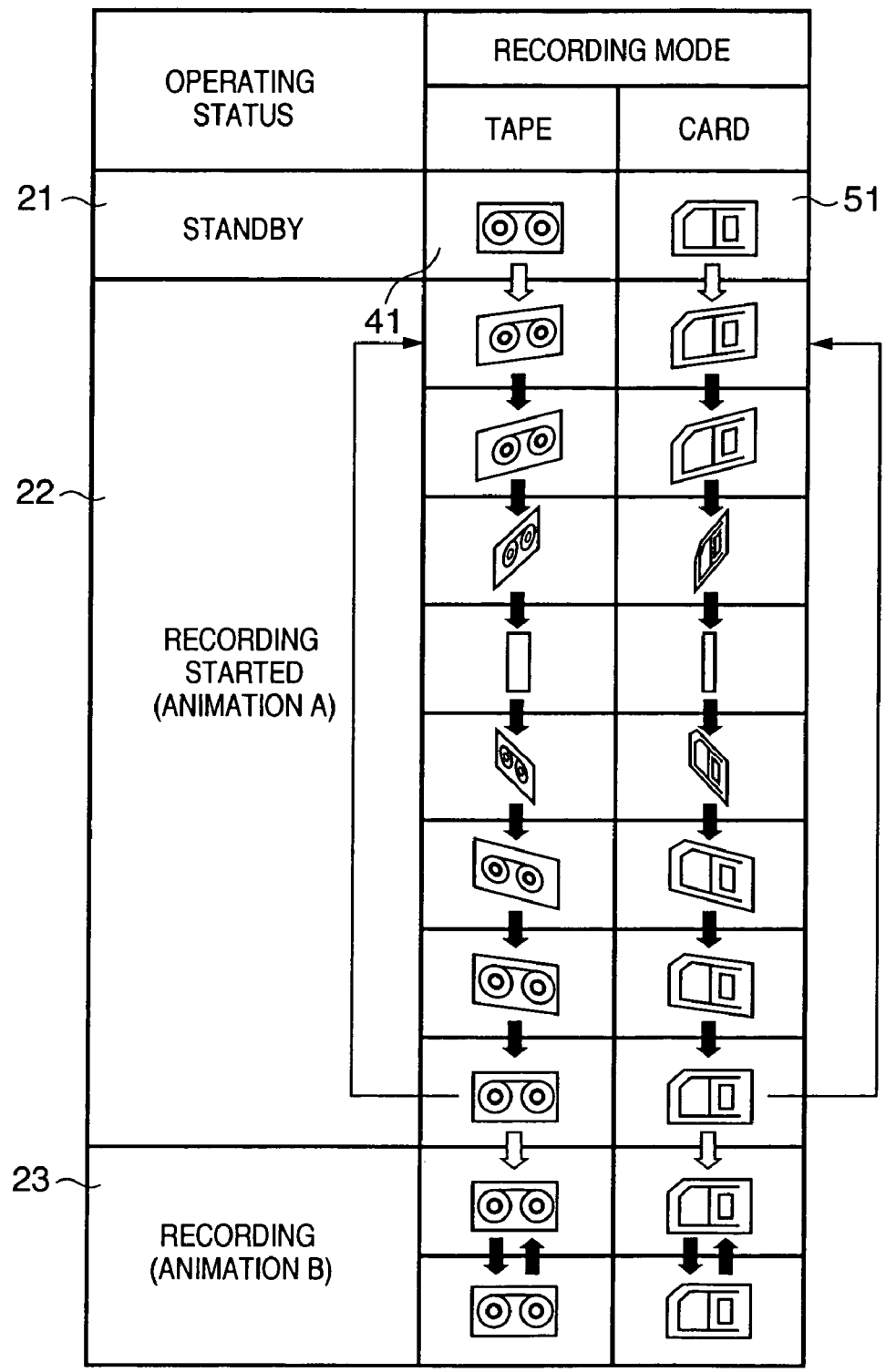
FIG. 3 is a diagram illustrating animated motions of icons performed in steps S16 and S17 in FIG. 2.

When the power switch 6 is turned on and the video camera 100 is in a shooting mode (playback mode will not be described in the embodiment), the system control unit 5 reads information according to shooting conditions out of a memory 5a and outputs it to the composition unit 3. Consequently, a composite image of information corresponding to each shooting condition and an acquired image is displayed on the liquid crystal monitor 4. Incidentally, the memory 5a stores image data of character strings and image data of icons (pictographic characters) used for messages. FIG. 3 shows examples of icon images stored in the memory 5a (details will be described later).

Figure 2:
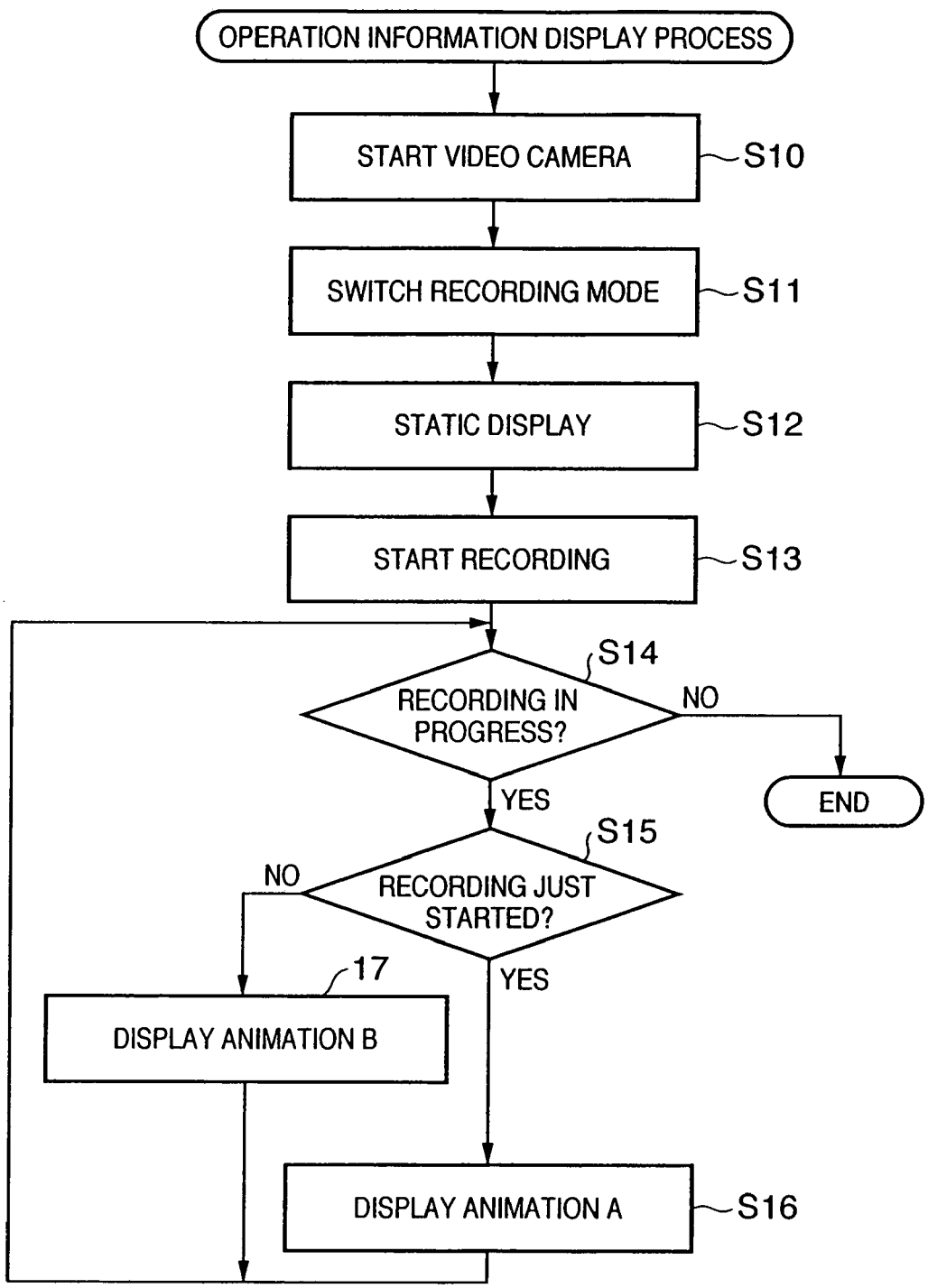
FIG. 2 is a flowchart showing procedures of an operation information display process performed by the video camera 100 shown in FIG. 1.

FIG. 2 is a flowchart showing procedures of an operation information display process performed by the video camera 100 shown in FIG. 1.

In FIG. 2, when the power switch 6 is turned on, the video camera 100 is started in camera shooting mode (step S10). Next, the system control unit 5 shifts the recording mode to tape recording mode or card recording mode according to the state of the mode selector switch 7 (step S11).

Figure 4:
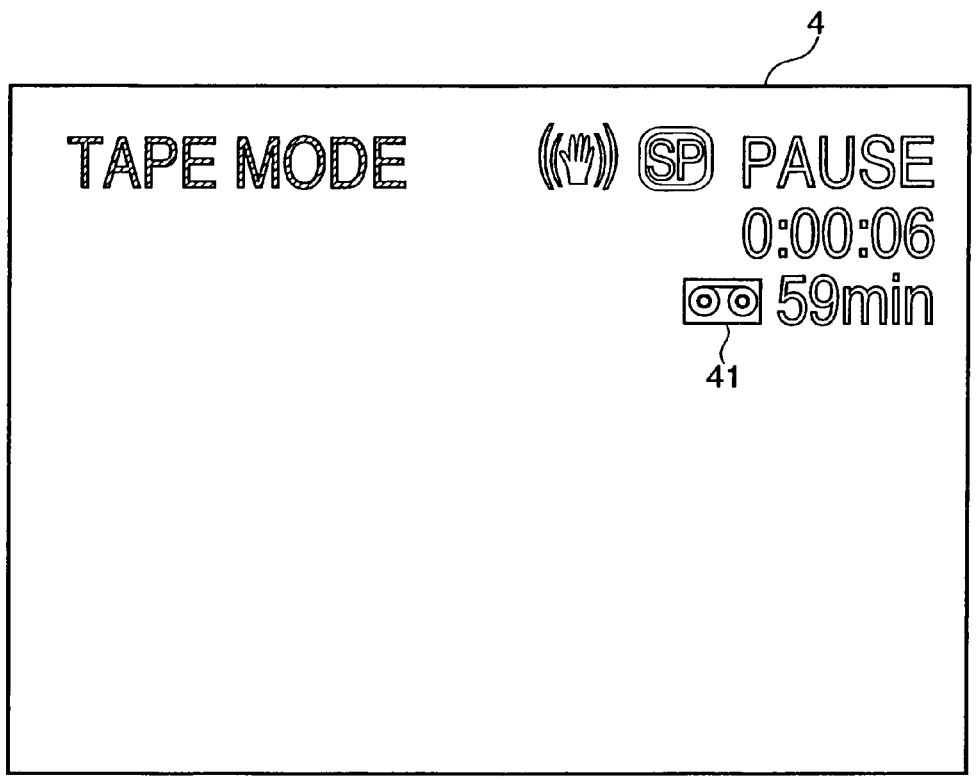
FIG. 4 is a diagram illustrating screen display of magnetic tape recording mode brought up in step S12 in FIG. 2.
Figure 5:
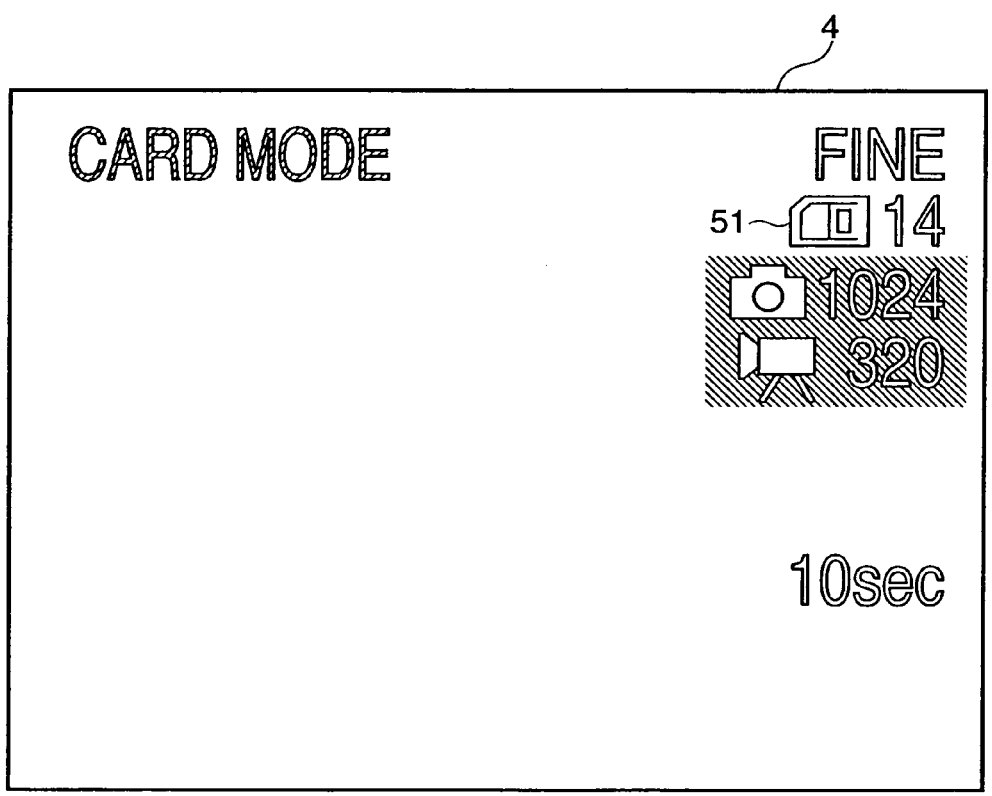
FIG. 5 is a diagram illustrating screen display of memory card recording mode brought up in step S12 in FIG. 2.

In step S12, the system control unit 5 reads character or icon information according to the current recording mode out of the memory 5a and outputs the information to the composition unit 3. Consequently, the liquid crystal monitor 4 displays a composite image as shown in FIG. 4 or 5. FIG. 4 shows a display example of the liquid crystal monitor 4 in tape recording mode while FIG. 5 shows a display example of the liquid crystal monitor 4 in card recording mode. As shown in FIGS. 4 and 5, a character string "TAPE MODE" or "CARD MODE" is displayed to clearly indicate the current recording mode. Also, a cassette tape icon (pictographic character) 41 or memory card icon (pictographic character) 51 for use during standby 21 as shown in FIG. 3 is displayed in the upper right corner of the screen, being retrieved from the memory 5a. Although not shown in FIGS. 4 and 5, images being sensed by the electronic camera unit 1 are superimposed on the display.

If it is judged that the record button 10 is ON, the system control unit 5 starts recording by driving the magnetic tape recording unit 8 or memory card recording unit 9 depending on the state of the mode selector switch 7 to write image data of still or moving images into the magnetic tape 8a or memory card 9a (step S13).

Next, the system control unit 5 judges whether or not recording is in progress (step S14).

If it is found in step S14 that recording is in progress, the system control unit 5 judges whether or not the recording has just started (step S15). If it is found that the recording has just started, the system control unit 5 ceases static display of the icon (for use during standby 21 as shown in FIG. 3) and displays animation by displaying some (eight in the figure) pictographic characters (icons) of cassette tape or memory card for use at the beginning of recording 22 as shown in FIG. 3, repeatedly in the direction indicated by the arrows (step S16). Consequently, immediately after the record switch 10 is turned ON in tape recording mode during standby, the icon 41 in FIG. 4 is displayed as if it were rotating. That is, the static display of the icon 41 changes to animated display (animation A), actively notifying the operator that the video camera 100 has changed its status from standby to video recording. Moreover, since the icon 41 is shaped like cassette tape, it is possible to inform the operator that images are being recorded in the magnetic tape cassette 8a via the magnetic tape recording unit 8. This is also true in the card recording mode.

Although in the embodiment, rotation of the icon has been cited as animated display of the icon 41 or 51 immediately after video recording is started, it is alternatively possible to vary the display position or size of the icon instead of rotating the icon. Immediately after video recording is started, in particular, by rotating or otherwise animating the icon 41 or 51 in the center of the liquid crystal monitor 4, it is possible to inform the operator reliably that video recording has been started and on what recording medium.

To determine whether recording has just started, a possible method involves judging whether a short time in seconds (approximately four or five seconds) which will not obstruct picture-taking has elapsed. Alternatively, the judgment may be based on how many frames of animation A in FIG. 3 have been displayed. In animation A in FIG. 3, assuming that icons are displayed at time intervals of 0.1 second, to provide an animated display for 4 seconds, 40 frames (=4/0.1) are needed. Since eight images are needed for the icon 41 to make one rotation, the period required for the icon to make five rotations can be regarded as the period immediately after recording is started.

When the display of animation A is finished, the judgment in step S15 gives a NO answer and animation B is displayed in step S17. In animation B, two icon images—large and small—are displayed alternately as shown in recording status 23 in FIG. 3. The animated motion continues until the record switch 10 is turned OFF by being pressed again. Animation B is displayed when a predetermined time elapses after start of recording onto a selected recording medium. This makes it possible to determine that the recording onto the selected recording medium is based on the intention of the operator. Since there seems to be no doubt that the operator is concentrating on shooting a subject, animation B is less conspicuous than animation A. Incidentally, it is desirable that the icons displayed in animation B is always placed in a corner of the liquid crystal monitor 4.

In the process shown in FIG. 2, when the record switch 10 is OFF (standby status), the icon 41 or 51 shaped like the recording medium corresponding to the selected recording mode is displayed statically. When the record switch 10 is turned ON (video recording status), the icon 41 or 51 is rotated or otherwise animated (display of animation A), allowing the operator to perceive visual changes. Consequently, the operator can easily recognize on what recording medium the acquired images will be stored. A predetermined time after the start of video recording, a change from animation A to animation B takes place, again causing the operator to experience visual changes and thereby ensuring that the operator is informed of the recording mode. This makes it possible to inform the user of the target recording medium at the time of recording, thereby minimizing mistakes in photography.

Although the magnetic tape recording unit 8 and memory card recording unit 9 have been cited as target recording media for the image data in the above embodiment, other recording media such as a magnetic hard disk and optical disk may be used alternatively.

As described above, the video camera according to the present invention displays a video signal consisting of outputted image data composited with target media information which indicates on which recording medium the image data will be recorded out of a plurality of recording media, it is possible to make the user recognize the target recording medium without confusing it.

Preferably, the target media information is presented in a varying manner continuously for a predetermined period from the beginning of recording, ensuring that the user will recognize the target recording medium for the image data.

Preferably, the target media information is presented in a widely varying manner continuously for a predetermined period from the beginning of recording, and subsequently in a less varying manner, further ensuring that the user will recognize the target recording medium for the image data.

As many apparently widely different embodiments of the present invention can be made without departing from the spirit and scope thereof, it is to be understood that the invention is not limited to the specific embodiments thereof except as defined in the appended claims.

What is claimed is:

1. A video camera comprising:
an electronic camera unit which outputs image data; a first recording medium which records the outputted image data; a second recording medium which records the outputted image data; a switching unit which switches a target recording medium for the outputted image data between the first recording medium and the second recording medium; an information composition unit which composites the outputted image data with predetermined information and outputs a resulting video signal; and a display unit which displays the video signal outputted by the information composition unit,
wherein the predetermined information is target media information which indicates whether the outputted image data is to be recorded on the first recording medium or the second recording medium, and
wherein the display unit displays a predetermined number of frames of the target media information in a different form from the beginning of recording, and subsequently displays a smaller number of frames of the target media information than the predetermined number in a different form.

2. A video camera, having an image sensing unit, capable of mounting a first recording medium which stores acquired images, and a second recording medium which is different from the first recording medium, the video camera comprising:
a selection unit which selects whether the images sensed by the image sensing unit are to be stored on the first or second recording medium;
a display unit which displays the images sensed by the image sensing unit and state of equipment;
a record command unit which gives a command to start or stop recording the images sensed by the image sensing unit on the recording medium selected by the selection unit; and
a display control unit which controls the display unit according to the command given by the record command unit,
wherein the display control unit:
displays a still image icon in the display unit, indicating the recording medium selected by the selection unit if recording on the selected recording medium is stopped, and
displays an animated icon in the display unit, indicating the recording medium selected by the selection unit if recording on the selected recording medium is in progress.

3. The video camera according to claim 2, wherein the display unit displays different animated icons between a first period until a predetermined period elapses after start of recording on the selected recording medium and a second period after the first period.

4. The video camera according to claim 3, wherein the display control unit displays an icon in a rotational manner in the first period and displays the icon by varying the size of the icon in the second period.

* * * * *